US010420103B2

United States Patent
Wang et al.

(10) Patent No.: US 10,420,103 B2
(45) Date of Patent: Sep. 17, 2019

(54) UPLINK INTER-SITE CARRIER AGGREGATION BASED ON UE TRANSMISSION POWER AND SECONDARY CELL LOAD

(71) Applicant: Nokia Solutions and Networks Oy, Espoo (FI)

(72) Inventors: Hua Wang, Aalborg (DK); Claudio Rosa, Randers (DK); Klaus Ingemann Pedersen, Aalborg (DK)

(73) Assignee: Nokia Solutions and Networks Oy, Espoo (FI)

( * ) Notice: Subject to any disclaimer, the term of this patent is extended or adjusted under 35 U.S.C. 154(b) by 168 days.

(21) Appl. No.: 14/917,079

(22) PCT Filed: Sep. 13, 2013

(86) PCT No.: PCT/EP2013/069074
§ 371 (c)(1),
(2) Date: Mar. 7, 2016

(87) PCT Pub. No.: WO2015/036047
PCT Pub. Date: Mar. 19, 2015

(65) Prior Publication Data
US 2016/0205685 A1    Jul. 14, 2016

(51) Int. Cl.
*H04W 72/04* (2009.01)
*H04W 72/12* (2009.01)
(Continued)

(52) U.S. Cl.
CPC ......... *H04W 72/0453* (2013.01); *H04L 5/001* (2013.01); *H04L 5/0035* (2013.01);
(Continued)

(58) Field of Classification Search
CPC ........ H04W 72/0413; H04W 72/0453; H04W 72/0486; H04W 72/082; H04L 5/098
See application file for complete search history.

(56) References Cited

U.S. PATENT DOCUMENTS

| 2013/0194947 A1 | 8/2013 | Ehsan et al. ................. 370/252 |
| 2014/0092786 A1* | 4/2014 | He ..................... H04W 52/0258 370/280 |

(Continued)

FOREIGN PATENT DOCUMENTS

WO    WO 2013/116988 A1    8/2013

OTHER PUBLICATIONS

3GPP TSG RAN WG1 Meeting #73, Fukuoka, Japan, May 20-24, 2013, R1-132558, "CA extension in support of inter-site CA", ETRI, 3 pgs.
(Continued)

*Primary Examiner* — Charles C Jiang
*Assistant Examiner* — Ryan C Kavleski
(74) *Attorney, Agent, or Firm* — Harrington & Smith

(57) ABSTRACT

A method for use in a user equipment, including transferring data to the base station of a first cell (A1); sending an uplink scheduling request to the base station of a second cell (A3) in dependence on the condition that the user equipment has sufficient transmission power for performing inter-site carrier aggregation (A2); receiving an uplink resource allocation message from the base station of the second cell (A5) if the load of the second cell satisfies predetermined conditions (A4); transferring data to the base stations of the first and second cells via carrier aggregation (A6).

18 Claims, 10 Drawing Sheets

(51) Int. Cl.
*H04W 72/08* (2009.01)
*H04L 5/00* (2006.01)
*H04W 28/06* (2009.01)

(52) U.S. Cl.
CPC ....... *H04L 5/0098* (2013.01); *H04W 72/0413* (2013.01); *H04W 72/0486* (2013.01); *H04W 72/082* (2013.01); *H04L 5/006* (2013.01); *H04L 5/0044* (2013.01); *H04L 5/0073* (2013.01); *H04W 28/06* (2013.01); *H04W 72/12* (2013.01)

(56) References Cited

U.S. PATENT DOCUMENTS

| | | | |
|---|---|---|---|
| 2014/0314000 A1* | 10/2014 | Liu | H04W 72/042 370/329 |
| 2015/0003418 A1* | 1/2015 | Rosa | H04W 36/0005 370/331 |
| 2015/0078261 A1* | 3/2015 | Yu | H04W 72/0453 370/329 |
| 2015/0117342 A1* | 4/2015 | Loehr | H04W 72/1284 370/329 |
| 2015/0341148 A1* | 11/2015 | Kazmi | H04L 5/0098 370/252 |
| 2016/0119856 A1* | 4/2016 | Hwang | H04W 48/08 370/328 |

OTHER PUBLICATIONS

3GPP TSG-RAN WG2 Meeting #83, Barcelona, Spain, Aug. 19-23, 2013, R2-132339, "Autonomous SCell Management for Dual Connectivity Cases", NSN, Nokia Corporation, 4 pgs.

\* cited by examiner

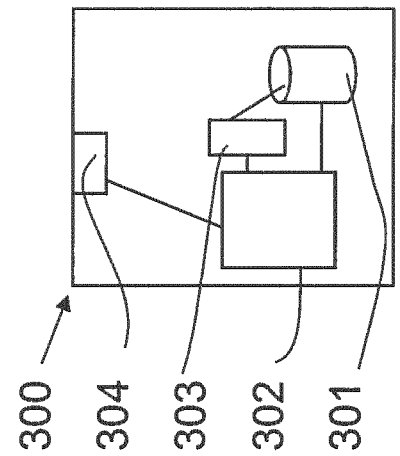
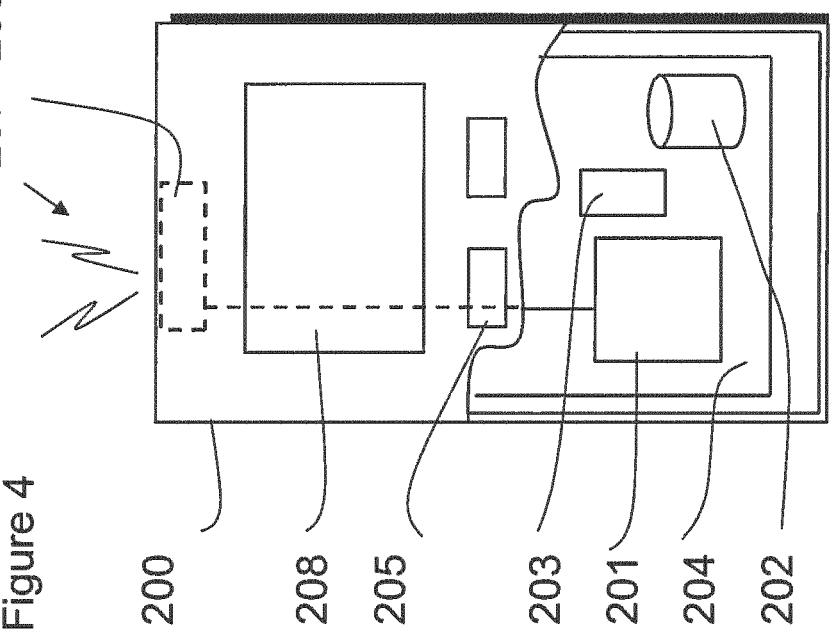

UPLINK INTER-SITE CARRIER AGGREGATION BASED ON UE TRANSMISSION POWER AND SECONDARY CELL LOAD

TECHNICAL FIELD

Some embodiments relate to a method and apparatus and in particular but not exclusively to a method and apparatus for use in carrier aggregation scenarios.

BACKGROUND

A communication system can be seen as a facility that enables communication sessions between two or more nodes such as fixed or mobile communication devices, access points such as base stations, servers, machine type servers, routers, and so on. A communication system and compatible communicating devices typically operate in accordance with a given standard or specification which sets out what the various entities associated with the system are permitted to do and how that should be achieved. For example, the standards, specifications and related protocols can define the manner how communication devices shall communicate with the access points, how various aspects of the communications shall be implemented and how the devices and functionalities thereof shall be configured.

A user can access the communication system by means of an appropriate communication device. A communication device of a user is often referred to as user equipment (UE) or terminal.

Signals can be carried on wired or wireless carriers. Examples of wireless systems include public land mobile networks (PLMN), satellite based communication systems and different wireless local networks, for example wireless local area networks (WLAN). Wireless systems can be divided into coverage areas referred to as cells, such systems being often referred to as cellular systems. A cell can be provided by a base station, there being various different types of base stations. Different types of cells can provide different features. For example, cells can have different shapes, sizes, functionalities and other characteristics. A cell is typically controlled by a control node.

A communication device is provided with an appropriate signal receiving and transmitting arrangement for enabling communications with other parties. In wireless systems a communication device provides a transceiver station that can communicate with another communication device such as e.g. a base station and/or another user equipment. A communication device such as a user equipment (UE) may access a carrier provided by a base station, and transmit and/or receive on the carrier.

An example of cellular communication systems is an architecture that is being standardized by the 3rd Generation Partnership Project (3GPP). A recent development in this field is often referred to as the long-term evolution (LTE) of the Universal Mobile Telecommunications System (UMTS) radio-access technology. In LTE base stations providing the cells are commonly referred to as enhanced NodeBs (eNB). An eNB can provide coverage for an entire cell or similar radio service area.

Cells can provide different service areas. For example, some cells may provide wide coverage areas while some other cells provide smaller coverage areas. The smaller radio coverage areas can be located wholly or partially within a larger radio coverage area. For example, in LTE a node providing a relatively wide coverage area is referred to as a macro eNode B. Examples of nodes providing smaller cells, or local radio service areas, include femto nodes such as Home eNBs (HeNB), pico nodes such as pico eNodeBs (pico-eNB) and remote radio heads.

A device may communicate with more than one cell. Communications with more than one cell may be provided e.g. to increase performance. A way of providing this could be, for example, based on carrier aggregation (CA). In carrier aggregation a plurality of carriers are aggregated to increase bandwidth. Carrier aggregation comprises aggregating a plurality of component carriers.

LTE-Advanced is an example of a system capable of providing carrier aggregation. In LTE-A two or more component carriers (CCs) can be aggregated in order to support wider transmission bandwidths and/or for spectrum aggregation. Currently it is envisaged that the bandwidths can extend up to 100 MHz. Depending on its capabilities, it is possible to configure a user equipment (UE) to aggregate a different number of component carriers either from the same frequency band or different ones. A primary component carrier can be provided by a primary cell (PCell) whereas further carriers can be provided by at least one secondary cell (SCell). SCells form together with the PCell a set of serving cells. To enable reasonable battery consumption by the user equipment when aggregating carriers, an activation/deactivation mechanism of SCells is supported. When operated to provide CA a user equipment (UE) is configured with a primary cell (PCell). The PCell is used for taking care of security, Non-Access-Stratum (NAS) protocol mobility, and transmission of physical uplink control channel (PUCCH). All other configured CCs are called secondary cells (SCells).

Inter-site carrier aggregation has also been proposed. For example, it has been proposed that smaller cells could be used in conjunction with macro cells. In dual connectivity, a UE is connected to a macro cell and a small cell simultaneously. An aim of dual connectivity is to decrease mobility related signaling load towards the core network as well as to benefit from user throughput gains by the inter-site carrier aggregation for increased transmission bandwidth and scheduling flexibility. In some aspects dual connectivity is rather similar to CA with the macro cell serving as PCell and the small cells being SCells. However, in dual connectivity different eNBs provide the PCell and the sCell(s) as opposed to only one eNB according to e.g. 3GPP LTE Releases 10 and 11.

SUMMARY

According to an aspect, there is provided a method comprising: causing a request for allocation of resources to be sent from a user equipment to a second cell, said user equipment being in communication with at least one first cell such that carrier aggregation is provided when said user equipment is in communication with said second cell and said at least one first cell, said request being sent in dependence on at least one condition.

The at least one condition may comprise one or more of: power information associated with transmission by said user equipment; load information associated with said second cell; interference in said second cell; and an amount of data said user equipment is to transmit.

The request to said second cell may be sent only if said amount of data said user equipment is to transmit is above an amount.

The request for allocation of resources may comprise a request for allocation of resources for uplink transmission.

The request may comprise a scheduling request.

The method may comprise causing said request for allocation of resources to be sent in dependence on power transmission levels associated with said user equipment and receiving a response from said first cell indicating if said request is granted.

The request may be sent in response to control information received from at least one of said first and second cells.

The method may comprise determining said power transmission levels in said user equipment.

The method may comprise determining in said user equipment load information associated with said second cell prior to causing said request to be sent.

The method may be performed by an apparatus. The method may be performed by an apparatus of a user equipment.

According to another aspect, there is provided a method comprising: receiving a request for allocation of resources from a user equipment at a second cell, said user equipment being in communication with at least one first cell such that carrier aggregation is provided when said user equipment is in communication with said first cell and said second cell; and causing a response to be sent, wherein said user equipment is in communication with said first cell in dependence on at least one condition.

The at least one condition comprises one or more of: power information associated with transmission by said user equipment; load information associated with said second cell; interference in said second cell; and an amount of data said user equipment is to transmit.

The response may comprise information about loading in said second cell.

The method may comprise determining information about said loading in said second cell.

The method may comprise providing information to said first cell about loading in said second cell.

The information provided to said first cell may comprise at least one of physical resource block utilization and number of active user equipment.

The method may be performed in a base station.

According to an aspect, there is provided a method comprising: determining in a first cell at least one condition relating to a second cell, a user equipment being in communication with said first cell such that carrier aggregation is provided when said user equipment is in communication with said first cell and said second cell; and causing a control message to be sent to said user equipment which causes said user equipment to communicate with said first cell and said second cell.

The at least one condition comprises one or more of: load information associated with said second cell; and interference in said second cell.

The method may comprise receiving information from at least one of said second cell and said user equipment, said received information used in said determining.

The method may be performed by an apparatus. The apparatus may be in a base station.

According to another embodiment, there is provided an apparatus for use in a user equipment, said apparatus comprising at least one processor and at least one memory including computer code for one or more programs, the at least one memory and the computer code configured, with the at least one processor, to cause the apparatus at least to: cause a request for allocation of resources to be sent to a second cell, said user equipment being in communication with at least one first cell such that carrier aggregation is provided when said user equipment is in communication with said second cell and said at least one first cell, said request being sent in dependence on at least one condition.

The at least one condition may comprise one or more of: power information associated with transmission by said user equipment; load information associated with said second cell; interference in said second cell; and an amount of data said user equipment is to transmit.

The request to said second cell may be sent only if said amount of data said user equipment is to transmit is above an amount.

The request for allocation of resources may comprise a request for allocation of resources for uplink transmission.

The request may comprise a scheduling request.

The at least one memory and the computer code may be configured, with the at least one processor, to cause said request for allocation of resources to be sent in dependence on power transmission levels associated with said user equipment and to receive a response from said first cell indicating if said request is granted.

The request may be sent in response to control information received from at least one of said first and second cells.

The at least one memory and the computer code may be configured, with the at least one processor, to determine said power transmission levels in said user equipment.

The at least one memory and the computer code may be configured, with the at least one processor, to determine in said user equipment load information associated with said second cell prior to causing said request to be sent.

A user equipment may comprise the above described apparatus.

According to another embodiment, there is provided an apparatus for use in a second cell, said apparatus comprising at least one processor and at least one memory including computer code for one or more programs, the at least one memory and the computer code configured, with the at least one processor, to cause the apparatus at least to: receive a request for allocation of resources from a user equipment, said user equipment being in communication with at least one first cell such that carrier aggregation is provided when said user equipment is in communication with said first cell and said second cell; and cause a response to be sent, wherein said user equipment is in communication with said first cell in dependence on at least one condition.

The at least one condition comprises one or more of: power information associated with transmission by said user equipment; load information associated with said second cell; interference in said second cell; and an amount of data said user equipment is to transmit.

The response may comprise information about loading in said second cell.

The at least one memory and the computer code may be configured, with the at least one processor, to determine information about said loading in said second cell.

The at least one memory and the computer code may be configured, with the at least one processor, to provide information to said first cell about loading in said second cell.

The information provided to said first cell may comprise at least one of physical resource block utilization and number of active user equipment.

The apparatus may be provided in a base station.

According to another embodiment, there is provided an apparatus for use in a first cell, said apparatus comprising at least one processor and at least one memory including computer code for one or more programs, the at least one memory and the computer code configured, with the at least one processor, to cause the apparatus at least to: determine at least one condition relating to a second cell, a user equipment being in communication with said first cell such that carrier aggregation is provided when said user equipment is in communication with said first cell and said second cell; and cause a control message to be sent to said user equipment which causes said user equipment to communicate with said first cell and said second cell.

The at least one condition comprises one or more of: load information associated with said second cell; and interference in said second cell.

The at least one memory and the computer code may be configured, with the at least one processor, to receive information from at least one of said second cell and said user equipment, said received information used in said determining.

According to another aspect, there is provided an apparatus for use in a user equipment, said apparatus comprising: means for causing a request for allocation of resources to be sent to a second cell, said user equipment being in communication with at least one first cell such that carrier aggregation is provided when said user equipment is in communication with said second cell and said at least one first cell, said request being sent in dependence on at least one condition.

The at least one condition may comprise one or more of: power information associated with transmission by said user equipment; load information associated with said second cell; interference in said second cell; and an amount of data said user equipment is to transmit.

The request to said second cell may be sent only if said amount of data said user equipment is to transmit is above an amount.

The request for allocation of resources may comprise a request for allocation of resources for uplink transmission.

The request may comprise a scheduling request.

The causing means may cause said request for allocation of resources to be sent in dependence on power transmission levels associated with said user equipment and said apparatus may comprise means for receiving a response from said first cell indicating if said request is granted.

The request may be sent in response to control information received from at least one of said first and second cells.

The apparatus may comprise means for determining said power transmission levels in said user equipment.

The apparatus may comprise means for determining in said user equipment load information associated with said second cell prior to causing said request to be sent.

A user equipment may comprise the above described apparatus.

According to another aspect, there is provided an apparatus for use in a second cell, said apparatus comprising: means for receiving a request for allocation of resources from a user equipment, said user equipment being in communication with at least one first cell such that carrier aggregation is provided when said user equipment is in communication with said first cell and said second cell; and means for causing a response to be sent, wherein said user equipment is in communication with said first cell in dependence on at least one condition.

The at least one condition comprises one or more of: power information associated with transmission by said user equipment; load information associated with said second cell; interference in said second cell; and an amount of data said user equipment is to transmit.

The response may comprise information about loading in said second cell.

The apparatus may comprise means for determining information about said loading in said second cell.

The apparatus may comprise means for providing information to said first cell about loading in said second cell.

The information provided to said first cell may comprise at least one of physical resource block utilization and number of active user equipment.

A base station may comprise the above apparatus.

According to another embodiment, there is provided an apparatus for use in a first cell, said apparatus comprising: means for determining at least one condition relating to a second cell, a user equipment being in communication with said first cell such that carrier aggregation is provided when said user equipment is in communication with said first cell and said second cell; and means for causing a control message to be sent to said user equipment which causes said user equipment to communicate with said first cell and said second cell.

The at least one condition comprises one or more of: load information associated with said second cell; and interference in said second cell.

The apparatus may comprises means for receiving information from at least one of said second cell and said user equipment, said received information used in said determining.

The apparatus may be provided in a base station.

A computer program comprising program code means adapted to perform the method(s) may also be provided. The computer program may be stored and/or otherwise embodied by means of a carrier medium.

In the above, many different embodiments have been described. It should be appreciated that further embodiments may be provided by the combination of any two or more of the embodiments described above.

Various other aspects and further embodiments are also described in the following detailed description and in the attached claims.

BRIEF DESCRIPTION OF THE DRAWINGS

Some embodiments will now be described, by way of example only, with respect to the following Figures in which:

FIG. 4 shows a schematic diagram of a mobile communication device according to some embodiments;

FIG. 5 shows a schematic diagram of a control apparatus according to some embodiments;

DETAILED DESCRIPTION

In the following certain exemplifying embodiments are explained with reference to a wireless or mobile communication system serving mobile communication devices. Before explaining in detail the exemplifying embodiments, certain general principles of a wireless communication system and nodes thereof and mobile communication devices are briefly explained with reference to FIGS. 1 to 5 to assist in understanding the context of the described examples.

A non-limiting example of the recent developments in communication system architectures is the long-term evolution (LTE) of the Universal Mobile Telecommunications System (UMTS) that is being standardized by the 3rd Generation Partnership Project (3GPP). The LTE employs a mobile architecture known as the Evolved Universal Terrestrial Radio Access Network (E-UTRAN). Base stations of such systems are known as evolved or enhanced Node Bs (eNBs) and may provide E-UTRAN features such as user plane Radio Link Control/Medium Access Control/Physical layer protocol (RLC/MAC/PHY) and control plane Radio Resource Control (RRC) protocol terminations towards the communication devices. Other examples of radio access system include those provided by base stations of systems that are based on technologies such as wireless local area network (WLAN) and/or WiMax (Worldwide Interoperability for Microwave Access). WLANs are sometimes referred to by WiFi™, a trademark that is owned by the Wi-Fi Alliance, a trade association promoting Wireless LAN technology and certifying products conforming to certain standards of interoperability.

Figure 1:
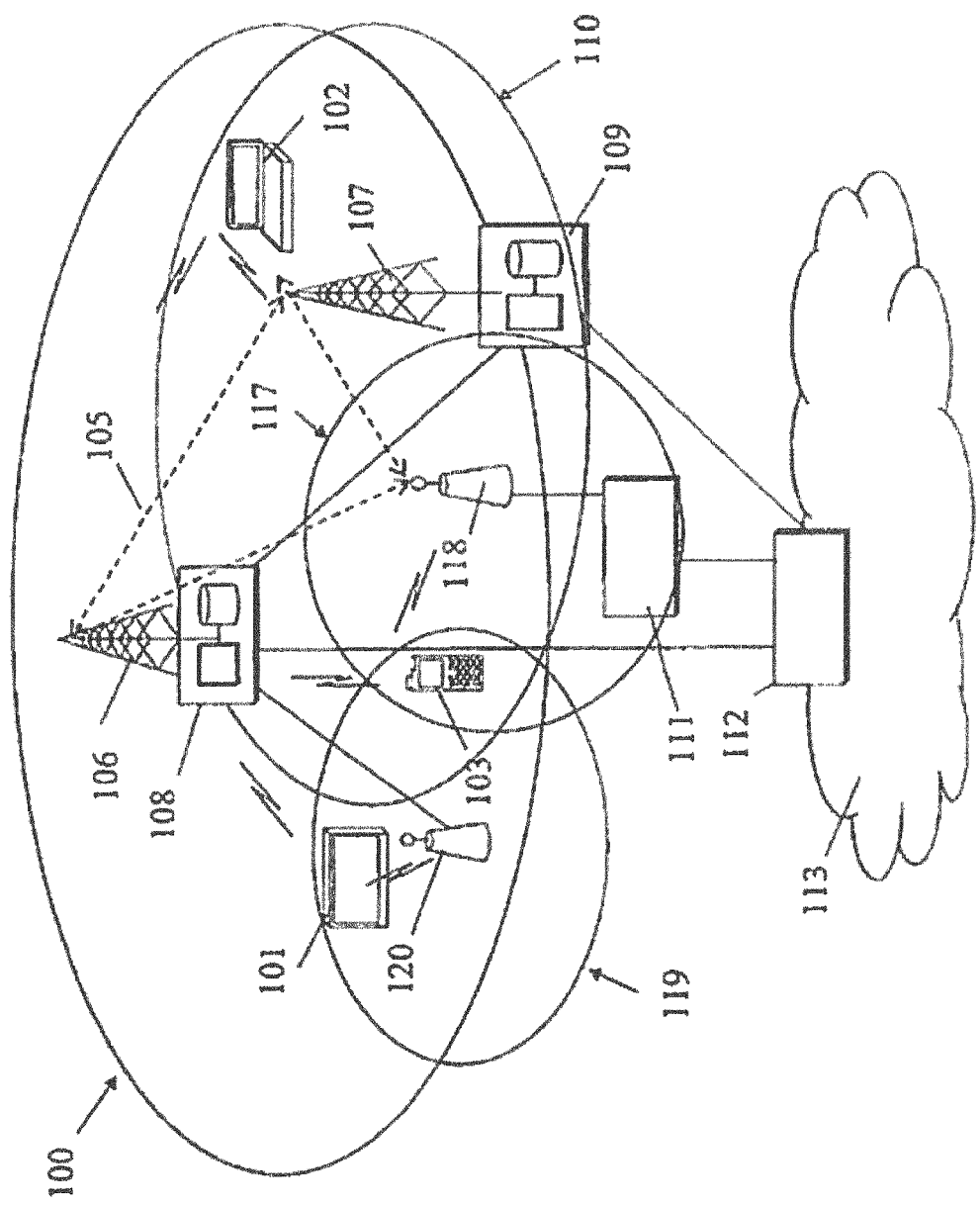
FIG. 1 shows a schematic diagram of a network according to some embodiments.

Different types of communication devices 101, 102, 103 can be provided wireless access via base stations or similar wireless transmitter and/or receiver nodes providing radio service areas or cells. In FIG. 1 different neighbouring and/or overlapping radio service areas or cells 100, 110, 117 and 119 are shown being provided by base stations 106, 107, 118 and 120. It is noted that the cell borders are schematically shown for illustration purposes only in FIG. 1. It shall be understood that the sizes and shapes of the cells or other radio service areas may vary considerably from the omnidirectional shapes of FIG. 1. A base station site can provide one or more cells or sectors, each sector providing a cell or a subarea of a cell. Each communication device and base station may have one or more radio channels open at the same time and may send signals to and/or receive signals from more than one source.

Base stations are typically controlled by at least one appropriate controller apparatus so as to enable operation thereof and management of mobile communication devices in communication with the base stations. The control apparatus can be interconnected with other control entities. The control apparatus can typically be provided with memory capacity and at least one data processor. The control apparatus and functions may be distributed between a plurality of control units. In some embodiments, each base station can comprise a control apparatus. In alternative embodiments, two or more base stations may share a control apparatus. In some embodiments the control apparatus may be respectively provided in each base station.

Different types of possible cells include those known as macro cells, pico cells and femto cells. For example, transmission/reception points or base stations can comprise wide area network nodes such as a macro eNode B (eNB) which may, for example, provide coverage for an entire cell or similar radio service area. A base station can also be provided by small or local radio service area network node, for example Home eNBs (HeNB), pico eNodeBs (pico-eNB), or femto nodes. Some applications utilise radio remote heads (RRH) that are connected to for example an eNB. As cells can overlap a communication device in an area can listen and transmit to more than one base station. Smaller radio service areas can be located entirely or at least partially within a larger radio service area. A communication device may thus communicate with more than one cell.

In a particular example, FIG. 1 depicts a primary cell (PCell) 100. In this example the primary cell 100 can be provided by a wide area base station 106 provided by a macro-eNB. The macro-eNB 106 transmits and receives data over the entire coverage of the cell 100. A secondary cell (SCell) 110 in this example is a pico-cell. A secondary cell can also be provided by another suitable small area network node 118 such as Home eNBs (HeNB) (femto cell) or another pico eNodeBs (pico-eNB). A yet further cell 119 is shown to be provided by a remote radio head (RRH) 120 connected to the base station apparatus of cell 100. These smaller cells are referred to as small cells in the document.

Base stations may communicate via each other via fixed line connection and/or air interface. The logical connection between the base station nodes can be provided for example by an X2 interface. In FIG. 1 this interface is shown by the dashed line denoted by 105.

Figure 2:
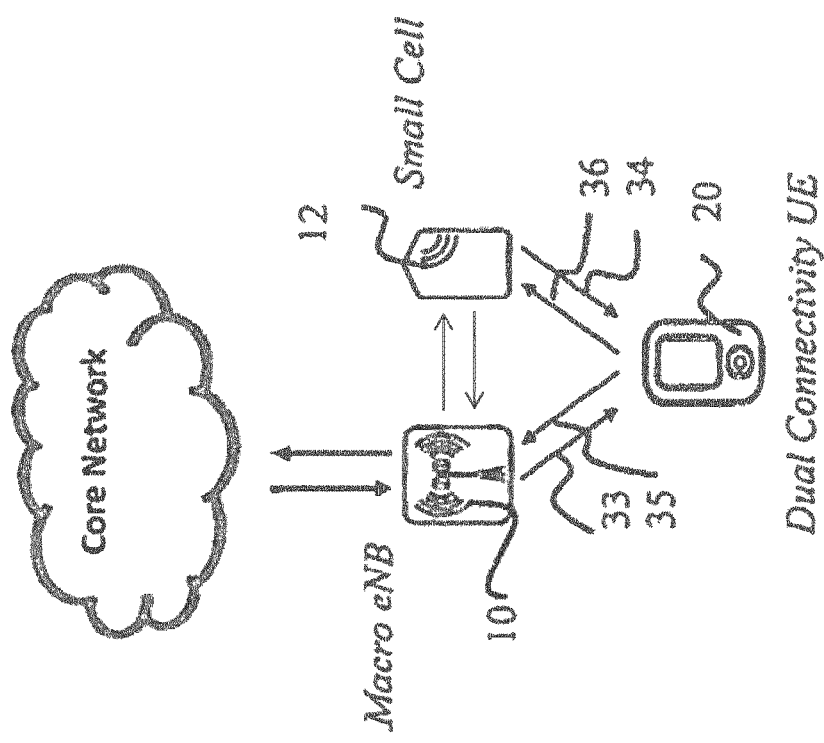

FIG. 2 shows an example for dual connectivity where a UE 20 is connected to a macro cell 10 and a small cell 12 simultaneously. The macro cell 10 is in communication with the core network. The small cell 12 is in communication with the core network via the macro cell 10. The macro cell and the small cell may communication via the Xn interface.

Figure 3:
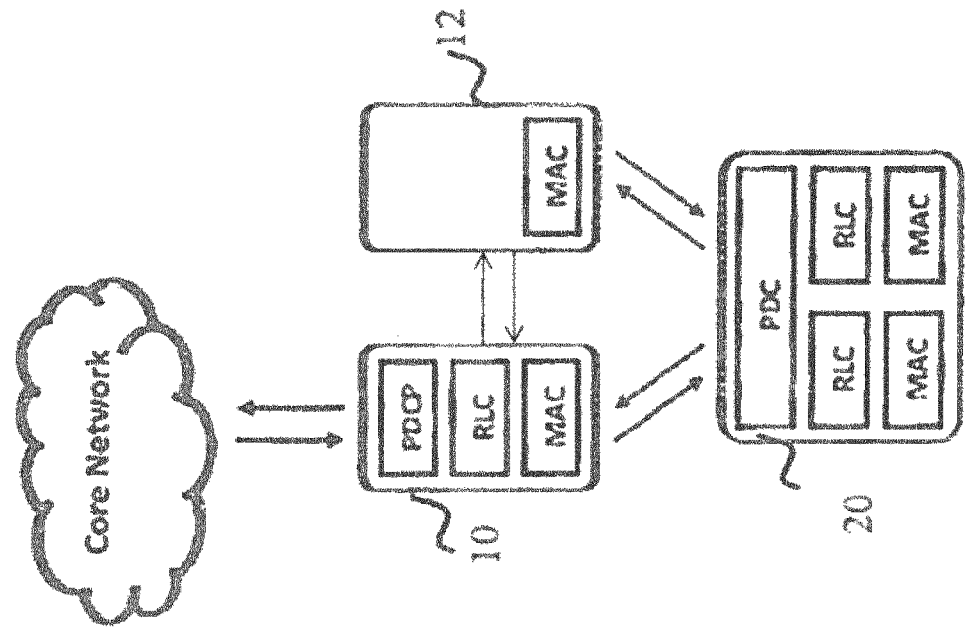
FIGS. 2 and 3 are simplified examples illustrating the principle of dual connectivity.

Reference is made to FIG. 3. For inter-site CA in UL the receiving RLC entity may be located in the MeNB, in some embodiments. The SeNB may not having a corresponding RLC entity. UL RLC PDUs (packet data units) delivered in UL to the SeNB are simply forwarded to the MeNB via the Xn interface. H However, in some embodiments the SeNB may be provided with UL RLC functionality.

A Common Packet Data Convergence Protocol (PDCP) with separated Radio Link Control (RLC) and Medium Access Control (MAC) can be used for user plane communications. The macro eNB 10 can host the Packet Data Convergence Protocol (PDCP) layer and a RLC layer while both the macro cell and the small cell host one MAC each. The arrangement of the layers is shown in FIG. 3. The cells also host one physical layer each beneath these layers.

In the downlink, each bearer is first split in the macro to component carriers 33 and 34 in order to go through both the macro eNB 10 and the small cell 12.

In the uplink, the UE splits the bearer below PDCP to component carriers 35 and 36 and feeds them to the macro cell and the small cell. The bearer to be split can comprise a radio bearer but this is not the only option.

In FIG. 1 stations 106 and 107 are shown as connected to a core network 113 via gateway 112. A further gateway function may be provided to connect the core network to another network. The smaller stations 118 and 120 can also be connected to the network 113, for example by a separate gateway function and/or via the macro level cells. In the example, station 118 is connected via a gateway 111 whilst station 120 connects via the controller apparatus 108.

A possible mobile communication device for transmitting to and receiving from a plurality of base stations will now be described in more detail with reference to FIG. 4 showing a schematic, partially sectioned view of a mobile communication device 200. Such a device is often referred to as user equipment (UE) or terminal. An appropriate mobile communication device may be provided by any device capable of sending radio signals to and/or receiving radio signals from multiple cells. Non-limiting examples include a mobile station (MS) such as a mobile phone or what is known as a 'smart phone', a portable computer provided with a wireless interface card, and USB stick or 'dongle' with radio, or other wireless interface facility, personal data assistant (PDA) provided with wireless communication capabilities, or any combinations of these or the like. A mobile communication device may provide, for example, communication of data for carrying communications such as voice, electronic mail (email), text message, multimedia and so on.

The mobile device may receive and transmit signals over an air interface 207 with multiple base stations via an appropriate transceiver apparatus. In FIG. 4 transceiver apparatus is designated schematically by block 206. The transceiver apparatus 206 may be provided for example by means of a radio part and associated antenna arrangement. The radio part is arranged to communicate simultaneously with different stations. The radio part may also be arranged to communicate via different radio technologies. For example, the radio part can provide a plurality of different radios. The antenna arrangement may be arranged internally or externally to the mobile device.

A mobile communication device is also provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204.

The user may control the operation of the mobile device by means of a suitable user interface such as key pad 205, voice commands, touch sensitive screen or pad, combinations thereof or the like. A display 208, a speaker and a microphone can also be provided. Furthermore, a mobile communication device may comprise appropriate connectors (either wired or wireless) to other devices and/or for connecting external accessories, for example hands-free equipment, thereto.

FIG. 5 shows an example of a control apparatus for a communication system, for example to be coupled to and/or for controlling a transceiver base station of a cell. The control apparatus 300 can be arranged to provide control on communications in the service area of a cell to provide the functions described below. In some embodiments a base station can comprise a control apparatus. In other embodiments the control apparatus can be another network element. The control apparatus 300 can be configured to provide control functions in association with configurations for dual connectivity arrangements by means of the data processing facility in accordance with certain embodiments described below. For this purpose the control apparatus comprises at least one memory 301, at least one data processing unit 302, 303 and an input/output interface 304. Via the interface the control apparatus can be coupled to a receiver and a transmitter of the base station. The control apparatus can be configured to execute an appropriate software code to provide the control functions. It shall be appreciated that similar component can be provided in a control apparatus provided elsewhere in the system for controlling configurations of secondary nodes/cells.

A wireless communication device, such as a mobile or base station, can be provided with a Multiple Input/Multiple Output (MIMO) antenna system for enabling multi-flow communications. MIMO arrangements as such are known. MIMO systems use multiple antennas at the transmitter and receiver along with advanced digital signal processing to improve link quality and capacity. More data can be received and/or sent where there are more antennae elements.

The performance and the need for cell cooperation techniques for two or more cells may depend on the carrier deployment scheme of macro and smaller cells. In dedicated carrier deployment, the macro and small cells use different carriers. The dedicated carrier case has the benefit of no inter-layer interference, but the disadvantage of not using the full system bandwidth at both the macro and smaller cells. Inter-site carrier aggregation (CA) concept introduces the possibility to aggregate carriers between the macrocell (configured as a PCell) and the small cell (configured as a SCell).

With inter-site CA, CA-capable UEs can be configured to connect to both the macro eNB and the smaller cell on different carriers so that they have access to a higher transmission bandwidth and therefore have the opportunity to be served at higher data rates. However, the UE is limited by the maximum transmission power in UL. For cell edge UEs transmitting at (or close to) maximum transmission power, the UEs may not have sufficient power to exploit the increased transmission bandwidth even if they are allowed to transmit to both the macro and smaller cells. Another major drawback of inter-site CA in the UL is the increased interference. When a UE is transmitting to both layers with inter-site CA, it also introduces additional interference to other cells (in the layer the UE would not connect but for the inter-site CA) which may degrade the overall performance.

The UE transmission power constraint and the potential increase in interference may counterbalance the gain brought by inter-site CA in the UL, and even result in a performance loss compared to the case without inter-site CA. Therefore, the configuration of UEs to operate with uplink inter-site CA has to be carefully designed.

Some embodiments may provide a mechanism of how to decide whether an UL CA-capable UE configured with inter-site CA should be allocated PUSCH (Physical uplink shared channel) on both macro and small cells, or only be scheduled on one of the macro and smaller cells. Some embodiments may address how this decision is signalled among the involved network elements (macro eNB, smaller cell eNB, and UE), for example in case of non-ideal backhaul link between the macro and smaller cell eNBs.

In some embodiments, the UE is configured with downlink inter-site CA, i.e. the UE is connected and synchronized to both macro and small cell eNBs. The UE has an uplink connection to both macro and small cell eNBs for transmission of (at least) uplink control information (UCI).

Some embodiments may provide a mechanism of how to initiate uplink data transmission to both macro and small cell layers simultaneously or more or less at the same time using uplink inter-site CA. Some embodiments may be used with UL CA capable UEs (i.e. supporting simultaneous transmission on macro and small cells) and alternatively or additionally could also apply to non UL CA capable UEs connected to macro and small cell eNBs in uplink using a TDM approach.

Figure 6:
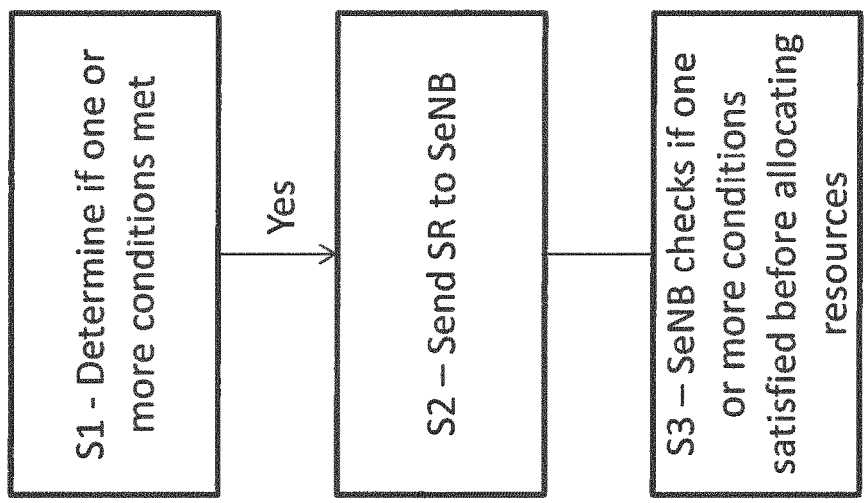
FIG. 6 shows a method according to some embodiments.

In the following examples, a UE is potentially in uplink communication with two cells. The two cells may both macro cells, both small cells or one macro cell and one small cell. Any other combination of two cells may be used in other embodiments. One of the cells may be a master MeNB and one of the cells may be a secondary SeNB. In some embodiments, the MeNB may be a macro eNB and the SeNB may be small cell eNB. However it should be appreciated that in other embodiments any one of the pair of cells may be MeNB while the other will be the SeNB Reference is made to FIG. 6 which shows a method of an embodiment.

In step S1, the UE determines and/or is provided with information indicating that one or more conditions are met.

In step S2, the UE sends a scheduling request (SR) towards the small cell eNB which in this embodiment is the SeNB only if one or more specific conditions are met.

In step S3, upon receiving the SR from the UE, the smaller cell eNB may optionally check for one or more further conditions before deciding to allocate resources such as PUSCH resources to the UE.

The one or more conditions may be determined/checked at the macro eNB which is the MeNB. The determination and/or checking may be based on existing and/or new measurements and measurement reports. The MeNB may signal to the UE when one or more such are fulfilled.

Alternatively or additionally, the one or more conditions may be autonomously determined in the UE.

The performance of uplink inter-site CA may be affected by one or more factors, such as UE power constraint, potential interference to other cells, and the cell load in the small cell. In some scenarios, the UE power constraint check may be particularly influential in the uplink inter-site CA performance. In step S3, the further condition may be cell load check.

In the uplink, the UE is limited by the maximum transmission power. For those UEs experiencing unfavourable channel conditions to either the macro or the small cell, even if they are allowed to transmit to both layers with inter-site CA, they may not have sufficient power to exploit the increased transmission bandwidth. Therefore, in some embodiments, it is considered whether the UE has enough power to manage transmissions on both layers simultaneously or if the UE should stay in one layer only.

Generally speaking, inter-site CA may be restricted to UEs with relatively good channel conditions to both the macro and small cells.

At low load, the UEs can be configured with uplink inter-site CA so that the UE can benefit from larger transmission bandwidth and increased scheduling flexibility. However, the gain brought by inter-site CA decreases as the load increases. At high load, there may be almost no CA gain. On the other hand, the interference to other cells brought by uplink inter-site CA increases as the load increases. Therefore, uplink inter-site CA may be beneficial at low load, but may degrade the overall performance at high load.

Some embodiments may check the UE power constraint and the load in smaller cell before a decision of initiating uplink dual-transmission is made. Based on the availability of the information residing in different entities, a number of different embodiments are possible.

The UE may have established a dual connection to both the macro and smaller cell with downlink inter-site CA, i.e. it is connected and synchronized to both macro and small cell eNBs. Therefore the UE has an uplink connection to both macro and smaller cell eNBs for (at least) transmission of UCI. For the sake of simplicity, it is assumed that the primary cell (PCell) is always at the macro cell, while the secondary cell (SCell) is on the smaller cell. However, in some embodiments, the opposite may be true.

An embodiment will now be described with reference to the signal flow shown in FIG. 7. In this example, the UE 20 power check and small cell load check are both performed at MeNB 10.

In step T1, the UE transfers data only to the MeB in the UL.

The MeNB may have information of the UE pathloss towards MeNB (estimated based on received signal strength and corresponding power headroom report) as well as the open loop power control (OLPC) parameters used in MeNB and SeNB (signaling of power control parameters over X2). However the MeNB potentially lacks the information of UE pathloss towards SeNB 12, which might be available in SeNB.

Thus in step T2, the MeNB gets this information from the SeNB (via an X2 message between the MeNB and SeNB). Alternatively, the MeNB could derive path loss to SeNB based on RSRP measurement report from the UE and available information on the SeNB pilot transmission power (again signaled over the X2 interface). This may require that a RSRP (reference signal received power) measurement report from the UE is transmitted (which might not be the case all the time). In some embodiments, the path loss towards the SeNB may be determined/estimated based on power control parameters used in the SeNB and power headroom report (PHR) from the UE. In step T3, the MeNB 10 carries out a UE power check. In particular, after the MeNB has all the needed information available, such as UE pathloss towards both cells, OPLC parameters in both cells, and the estimated number of allocated PRBs in both cells, the MeNB checks the total estimated transmission power to both cells. The estimated number of PRBs in the small cell may be take into account the number of active UEs in the SeNB. This information may be provided by the SeNB to the MeNB via the X2 interface. If the estimated transmission power is below a certain threshold, the UE is considered to be non-power-limited and becomes a candidate for uplink dual-transmission.

The load of the small cell is available at the MeNB 10 via the periodic exchange of load information (LI) messages between eNBs via the X2 interface in step T4. The LI messages exchanged between eNBs could be the average PRB (physical resource block) utilization and/or the number of active UEs with data to transmit.

In step T5, the number of active UEs may be used together with average PRB utilization to determine the load condition of the small cell as shown in Table. In some situations, an advantage of taking the number of active UEs into consideration when determining the cell load is that it gives some multi-user diversity gain compared to the case where only PRB utilization is available.

TABLE 1

| Definition of cell load | |
|---|---|
| Cell load | Condition |
| Low | PRB utilization ≤ LOW_PRB_UTILIZATION or Number of active UEs ≤ LOW_ACTIVE_UE |
| High | PRB utilization ≥ HIGH_PRB_UTILIZATION and Number of active UEs ≥ HIGH_ACTIVE_UE |
| Medium | Otherwise |

In step T6, if the UE is non-power-limited and the load in the smaller cell is low, the MeNB 10 signals to the UE 20 with a RRC/MAC message that it should initiate/activate uplink dual-transmission.

In step T7, upon receiving the uplink dual-transmission activation message from MeNB, the UE sends an uplink scheduling request towards SeNB.

In step T8, the SeNB provide the PUSCH to the UE.

In step T9, the UE transfers data in the UL to both the SeNB and the MeNB.

In some embodiments, this arrangement may use X2 signaling to convey information from the SeNB to MeNB on the number of user equipment with data to be scheduled in the SeNB.

It should be appreciated that steps T3 and T5 may be carried out in any order, at least partially overlap or take place at more or less the same time.

Figure 8:
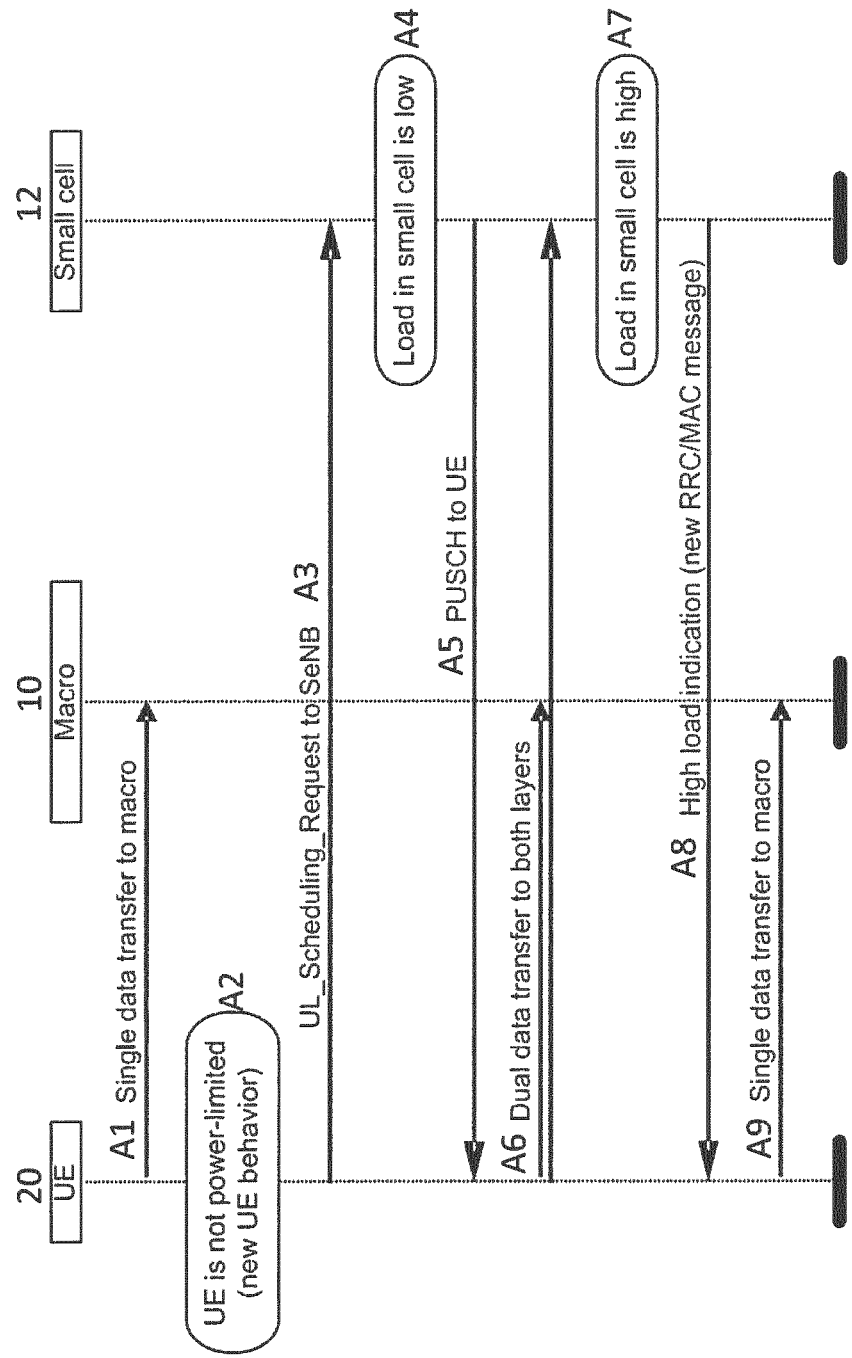
FIG. 8 shows as second signal flow.

Reference is made to FIG. 8 which shows a signal flow where the UE power check is performed at UE and small cell load check is performed at SeNB.

Figure 7:
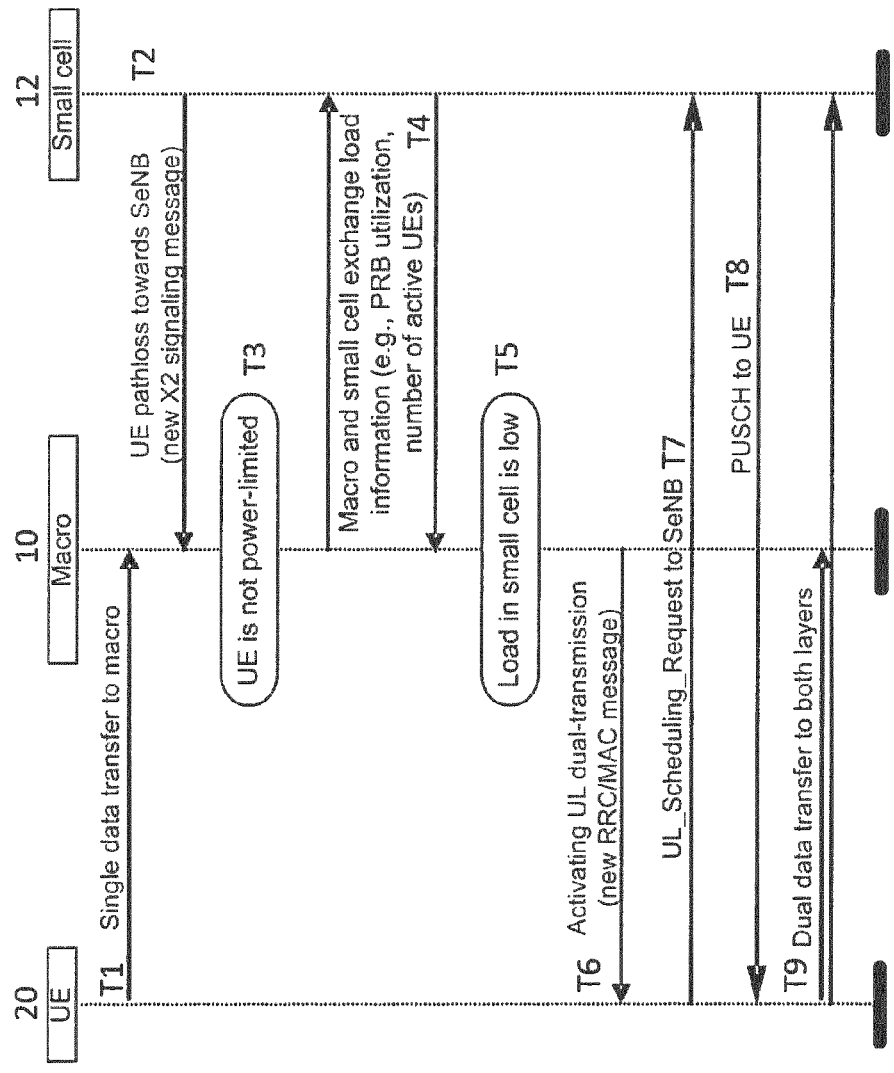
FIG. 7 shows a first signal flow.

It should be appreciated that step A1 is a described in relation to FIG. 7.

In step A2, a UE power check is carried out by the UE. There are a number of different ways in which the UE could do the power check. For example, one possibility is to use RSRP-based measurements. RSRP reflects the received power from each cell, implicitly capturing the path loss towards the respective sources. This may be used as a triggering criterion for requesting the activation of uplink inter-site CA. For example, if the received RSRP from MeNB and SeNB are both better than a certain threshold, the UE is considered to be non-power-limited, and sends a scheduling request towards SeNB (new UE behavior needs to be standardized). Alternatively or additionally, another possibility is to check the estimated Tx power. The UE might know the pathloss towards the MeNB and the SeNB, as well as OPLC parameters from MeNB and SeNB. Assuming a default number of allocated PRBs from SeNB, the UE can estimate its total transmission power if uplink dual-transmission is enabled.

In step A3, if it is determined that the UE is non-power-limited, the UE sends scheduling request to SeNB.

In step A4, the SeNB then checks its load and determine the load to be low. In step A5, if the load is low, the SeNB schedules the PUSCH to the UE. This is then followed by step A6 which corresponds to step T9 of FIG. 7.

As represented schematically by step A7, it is determined by the SeNB that the load is high. The SeNB may ignore the SR. In this case the UE could stop sending SR towards the SeNB if no PUSCH resources are allocation after X SR attempts. The UE may be provided with a prohibit timer to control when the next SR could be sent. In other words, the UE is prevented from sending a new SR unless a certain amount of time has lapsed since the last request. Alternatively or additionally, the SeNB signals back to the UE a RRC/MAC message indicating that the load in SeNB is high in step A8. A timer such as described above may be initiated by that message.

The UE will be in the single uplink data transfer mode with the MeNB in step A9.

Figure 9:
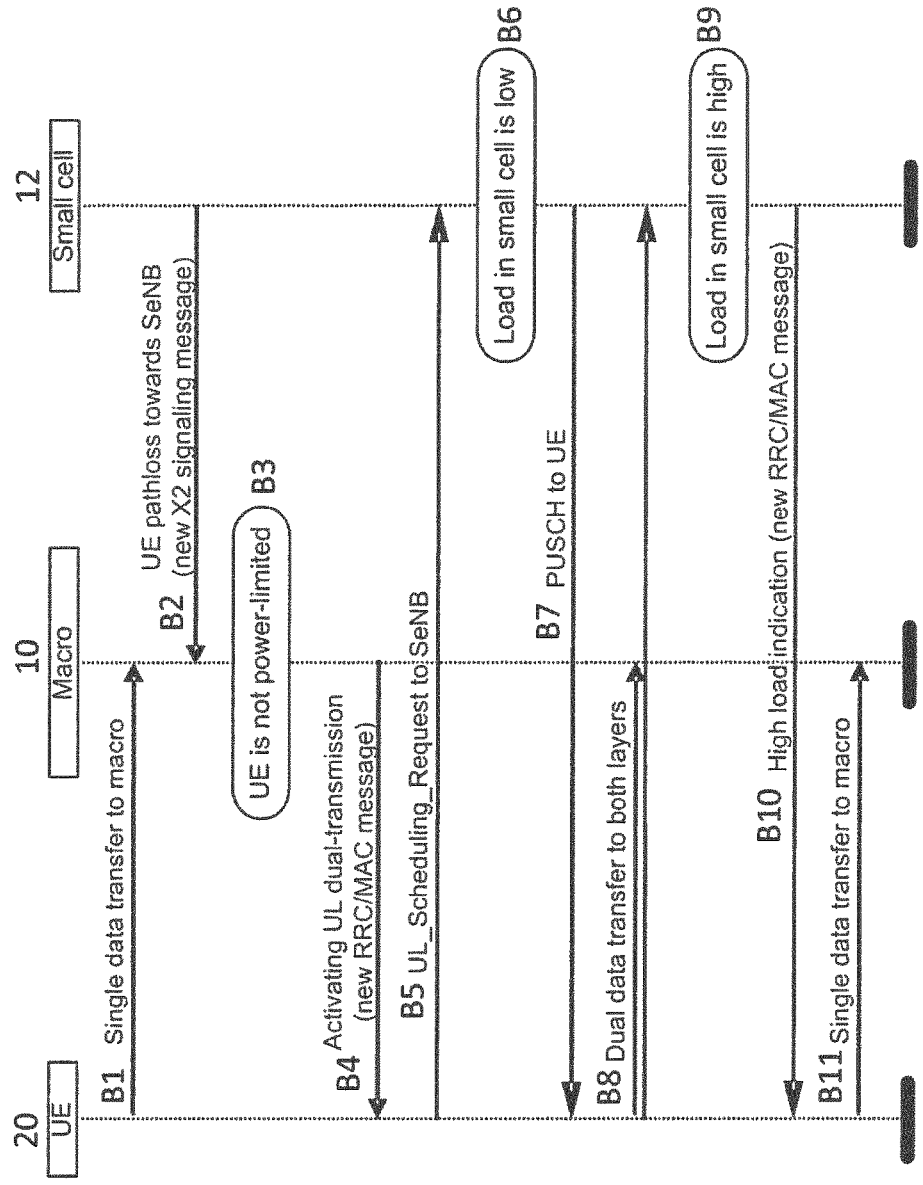
FIG. 9 shows a third signal flow.

Reference is made to FIG. 9 in which a UE power check is performed at MeNB and a small cell load check is performed at the SeNB.

It should be appreciated that in this embodiment, steps B1 to B3 correspond generally to steps T1 to T3. The UE power check may be the same as that carried out in the embodiment of FIG. 7 although in this case, the MeNB may not be able to estimate the average number of allocated PRBs in the SeNB and may assume a default number of allocated PRBs at SeNB such as in the embodiment of FIG. 8.

If the UE is non-power-limited, the MeNB signals to the UE with a RRC/MAC message activating uplink dual-transmission in step B4.

Upon receiving the uplink dual-transmission activation message from the MeNB, the UE starts sending an uplink scheduling request towards the SeNB in step B5.

A small cell load check is performed similar to that in FIG. 8. Accordingly steps B6 to B11 correspond to steps A4 to A9 of FIG. 8.

Figure 10:
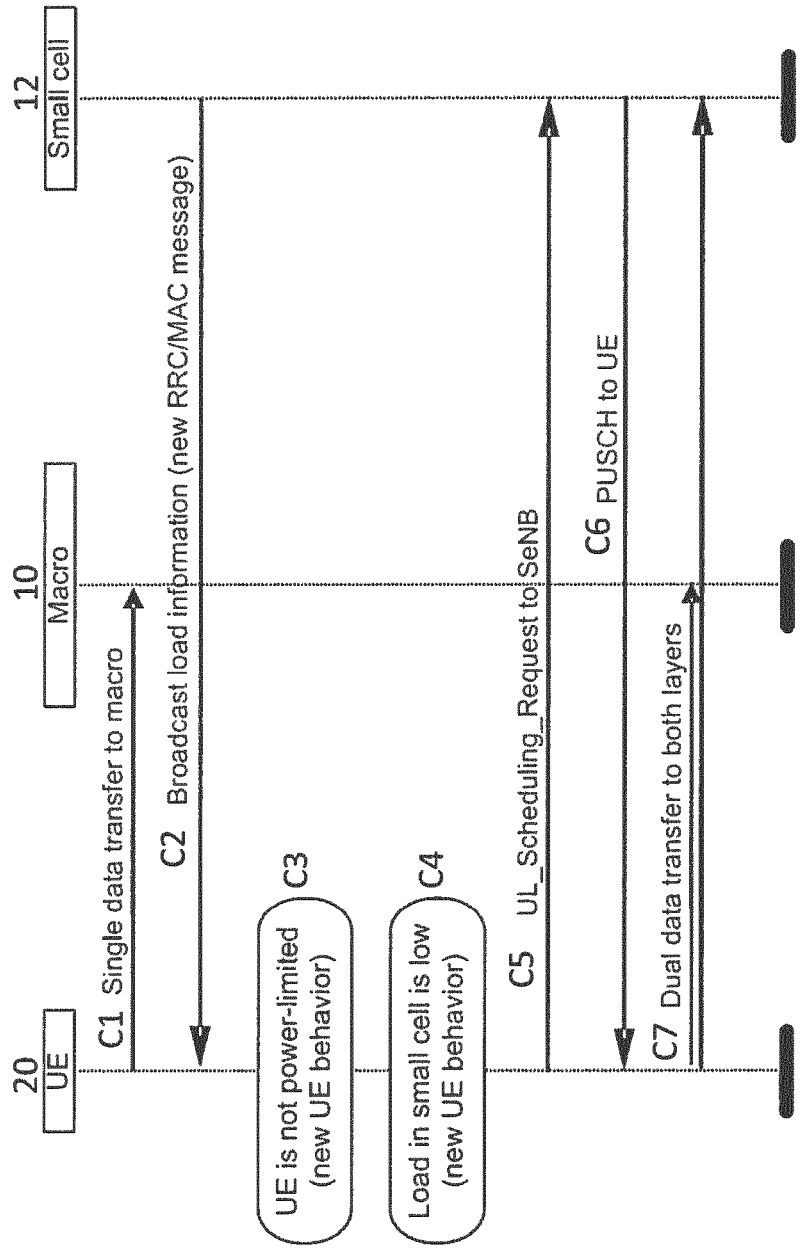
FIG. 10 shows a fourth signal flow.

Reference is made to FIG. 10 in which the UE power check and small cell load check are both performed at UE.

Step C1 corresponds to step T1 of FIG. 7.

In order to make the small cell load information (i.e. high, low, medium) available at the UE, the small cell 12 periodically broadcasts its load information to all UEs having that small cell as a potential SCell candidate in step C2.

In step C3 and C4, the UE checks the power and the load in the small cell. These steps can take place in either order or at more or less the same time.

The UE checks the transmission power ins step C3 which may be the same or similar to step A2 of FIG. 8.

If the UE is non-power-limited, then the UE checks the load in the small cell in step C4.

If the load in small cell is low, the UE sends uplink scheduling request towards SeNB in step C5.

Steps C6 and C7, then correspond generally to steps T8 and T9 of the flow of FIG. 7.

Some embodiments may have an advantage of the increased transmission bandwidth and scheduling flexibility by using UL inter-site CA. Some embodiments may take the UE transmission power constraint and the load in small cell into consideration when deciding whether a CA-capable UE should be configured with uplink dual-transmission using inter-site CA or not. At a relatively low load, non-power-limited UEs are configured to operate with inter-site CA so that they can benefit from larger transmission bandwidth and increased scheduling flexibility. At high load, UEs can only connect to one cell as there is little gain by CA and the use of inter-site CA will cause high interference.

Figure 11:
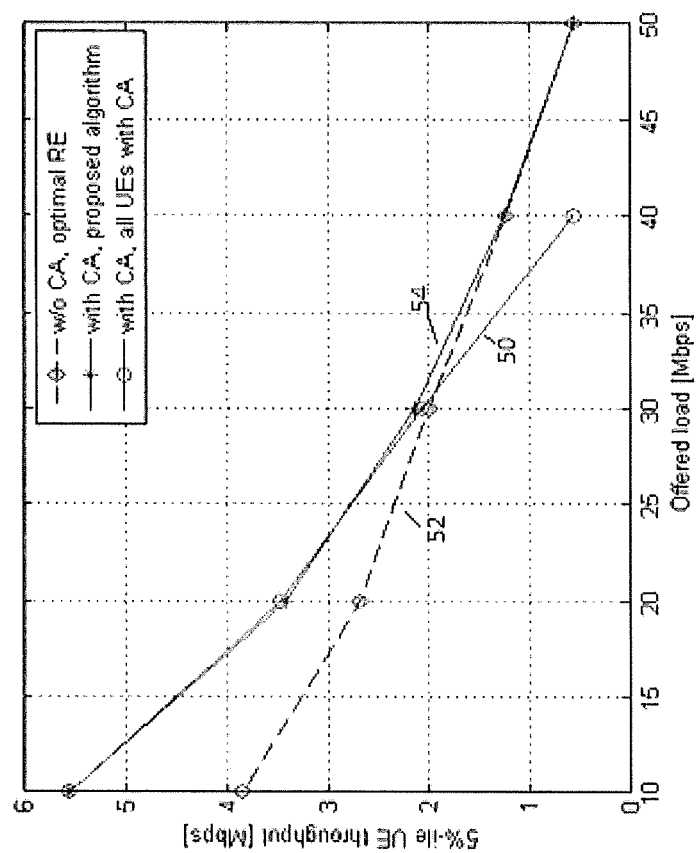
FIG. 11 shows a first graph of UE throughput against load.

Reference is made to FIG. 11 which shows a graph of five percentile user equipment throughput against offered load. Curve 50 shows a situation where all of the user equipment have carrier aggregation. The curve 54 shows a situation where there is carrier aggregation and one of the above embodiments is used. A curve 52 represents the situation where there is no carrier aggregation and there is optimal setting of range extension (RE. As it can be seen, the performance degrades rapidly as the load increases if all user equipment are configured with uplink inter site carrier aggregation. At high load, there is a significant performance loss compared to the case without inter site carrier aggregation. If there is no carrier aggregation, then with lower loads, the user equipment throughput is poorer if there is no carrier aggregation.

Figure 12:
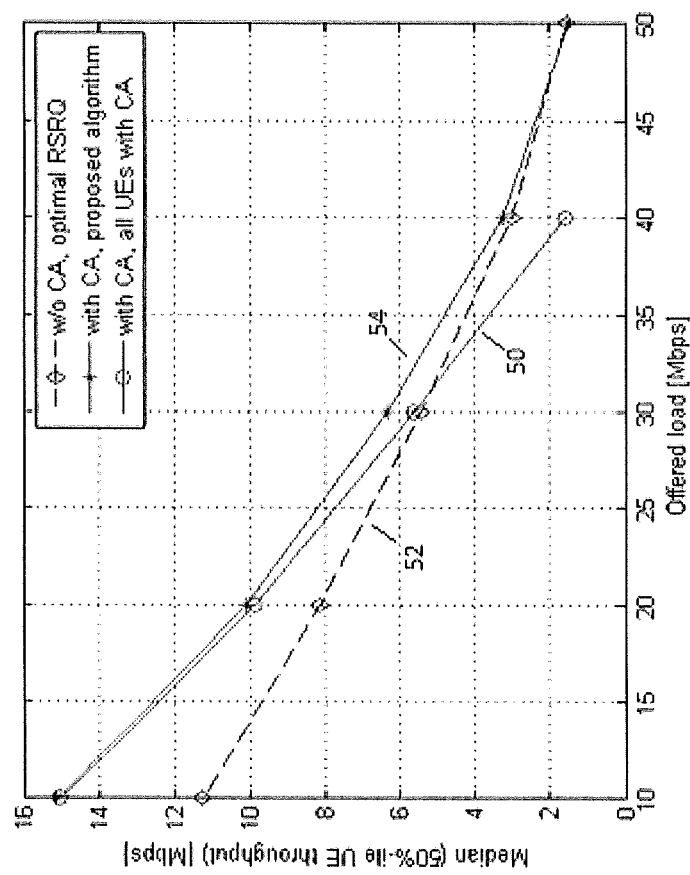
FIG. 12 shows a second graph of UE throughput against load.

FIG. 12 shows a similar graph with curve 56 representing the situation without carrier aggregation, the curve 60 representing the situation with carrier aggregation and all user equipment using carrier aggregation and curve 58 showing the situation where one of the previous embodiments are used. In this situation, the graph shows the median user equipment throughput against offered load.

Five percentile user throughput is the user throughput from the worst 5% users, which are normally located at the cell edge. Median user throughput is the 50%-ile user throughput. It is sometimes regarded as the average user throughput from all users.

In the above embodiments, the transmission of the SR is based on power and load information.

In other embodiments, the transmission may be alternatively or additionally based on the estimated interference to other cells if UL inter-site CA is enabled. If the estimated interference to other cells is low, the UE sends the SR towards SeNB.

In other embodiments, the transmission may be alternatively or additionally based on the amount of data available for transmission in the UE buffer for the corresponding radio bearer(s). If data amount is relatively low (i.e. below a threshold that may be directly or indirectly specified by the network), the UE might decide to only transmit the SR towards one eNB.

Some embodiments use a scheduling request. It should be appreciated that any other request for allocation of resources for uplink transmission may alternatively or additionally be used.

Embodiments have been described where a UE is in communication with two cells. Some embodiments may be used where a UE is in communication with three or more cells.

An appropriately adapted computer program code product or products may be used for implementing the embodiments, when loaded on an appropriate data processing apparatus, for example for determining geographical boundary based operations and/or other control operations. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments of the inventions may thus be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

It is also noted herein that while the above describes exemplifying embodiments of the invention, there are several variations and modifications which may be made to the disclosed solution without departing from the scope of the present invention.

The invention claimed is:

1. A method comprising:
    determining, by a user equipment being in communication of uplink data with at least one first cell of a communication network, that at least one condition associated with an amount of data said user equipment is to transmit is met, wherein said at least one condition comprises said amount of data said user equipment is to transmit is above or below a threshold value;
    in response to at least said amount of data said user equipment is to transmit being one of above or below the threshold value, causing, by the user equipment, a request for allocation of resources to be sent from the user equipment to a second cell, wherein said resources are requested for communicating the uplink data for said communication with at least the second cell,
    wherein based on said amount of data said user equipment is to transmit being below the threshold value said request is sent to only one base station of the second cell, and
    wherein based on the request the communication of uplink data is performed with only the one base station of the second cell.

2. A method as claimed in claim 1, wherein said at least one condition further comprises one or more of:
    power information associated with transmission by said user equipment is above or below a threshold value;
    load information associated with said second cell is above or below a threshold value; and
    interference in said second cell is above or below a threshold value.

3. A method as claimed claim 2, wherein based on said amount of data said user equipment is to transmit being above the threshold value said request for allocation of resources to the second cell is to provide carrier aggregation with said second cell and said at least one first cell for the communication by the user equipment, and
    wherein one of said at least one first cell and said second cell comprises a primary cell and another of said at least one first cell and said second cell comprises a secondary cell for the carrier aggregation.

4. A method as claimed in claim 1, wherein said request comprises one of a request for allocation of resources for uplink transmission or a scheduling request.

5. A method as claimed in claim 1, comprising causing said request for allocation of resources to be sent in dependence on power transmission levels associated with said user equipment and receiving a response from said at least one first cell indicating if said request is granted.

6. A method as claimed in claim 1, where said request is sent in response to control information received from at least one of said first cell and said second cell.

7. A method as claimed in claim 1, wherein said at least one first cell comprises a macro cell and said second cell comprises a small cell, and wherein the allocation of resources to be sent from the user equipment to the second cell is initiated by the user equipment based on a determined load in the small cell.

8. A method as claimed in claim 1, comprising determining in said user equipment load information associated with said second cell prior to causing said request to be sent.

9. A method comprising:
    receiving at a second cell from a user equipment in communication of uplink data with a first cell, a request based on at least one condition associated with an amount of data the user equipment has to transmit being one of above or below a threshold for allocation of resources from the second cell to said user equipment; and
    causing in response to the request, a resource allocation to the user equipment, wherein said resources are allocated for communicating the uplink data for said communication with at least the second cell,
    wherein based on said amount of data said user equipment is to transmit being below the threshold value said request is sent to only one base station of the second cell, and
    wherein based on the resource allocation the communication of uplink data is performed with only the one base station of the second cell.

10. A method as claimed in claim 9, wherein said at least one condition further comprises one or more of:
    power information associated with transmission by said user equipment is above or below a threshold value;
    load information associated with said second cell is above or below a threshold value; and
    interference in said second cell is above or below a threshold value.

11. A method as claimed in claim 9, comprising determining information about said loading in said second cell, wherein said response comprises information about loading in said second cell.

12. A method as claimed in claim 10,
wherein based on said amount of data said user equipment is to transmit being above the threshold value said allocation of resources to the second cell is to provide carrier aggregation with said second cell and said first cell for the communication by the user equipment, and
wherein one of said first cell and said second cell comprises a primary cell and another of said first cell and said second cell comprises a secondary cell for the carrier aggregation.

13. A method as claims in claim 12, wherein said information provided to said first cell comprises at least one of physical resource block utilization and number of active user equipment.

14. A non-transitory computer readable memory comprising computer executable instructions which by a processor to cause the method of claim 1 to be performed.

15. An apparatus for use in a user equipment, said apparatus comprising:
at least one processor; and
at least one memory including computer code for one or more programs, the at least one memory and the computer code configured, with the at least one processor, to cause the apparatus at least to:
determine by the user equipment being in communication of uplink data with a first cell that at least one condition associated with an amount of data the user equipment is to transmit is met, wherein said at least one condition comprises said amount of data said user equipment is to transmit is above or below a threshold value;
in response to at least said amount of data said user equipment is to transmit being one of above or below the threshold value, request for allocation of resources to be sent to a second cell, wherein said resources are requested for communicating uplink data for said communication with at least the second cell,
wherein based on said amount of data said user equipment is to transmit being below the threshold value said request is sent to only one base station of the second cell, and
wherein based on the request the communication of uplink data is performed with only the one base station of the second cell.

16. An apparatus as claimed in claim 15, wherein the at least one condition further comprises one or more of:
power information associated with transmission by said user equipment; load information associated with said second cell is above or below a threshold value; and
interference in said second cell is above or below a threshold value.

17. An apparatus as claimed in claim 15, wherein the request is sent to only one base station of the the-second cell.

18. The apparatus as claimed in claim 15, wherein based on said amount of data said user equipment is to transmit being above the threshold value said allocation of resources to the second cell is to provide carrier aggregation with said second cell and said first cell for the communication by the user equipment, and
wherein one of said first cell and said second cell comprises a primary cell and another of said first cell and said second cell comprises a secondary cell for the carrier aggregation.

\* \* \* \* \*